United States Patent
Robin et al.

[15] 3,676,530
[45] July 11, 1972

[54] PHOSPHATE ESTERS HINDERED THIOBISPHENOLS

[72] Inventors: Michael Robin, Colonia; Sheldon R. Schulte, Highland Park, both of N.J.

[73] Assignee: Ashland Oil & Refining Company, Houston, Tex.

[22] Filed: June 16, 1969

[21] Appl. No.: 833,807

[52] U.S. Cl..........................260/949, 252/400, 260/45.95, 260/923, 260/398.5, 260/814, 260/936, 260/941, 260/944, 260/945, 260/947, 260/975, 260/608, 260/607 R, 260/607 A, 260/609 F
[51] Int. Cl.......................................C07f 9/12, C08f 45/58
[58] Field of Search...........................................260/947, 949

[56] References Cited

UNITED STATES PATENTS

3,153,663   10/1964   Sirrenberg et al..................260/949 X

*Primary Examiner*—Joseph Rebold
*Assistant Examiner*—Anton H. Sutto
*Attorney*—Walter H. Schneider

[57] ABSTRACT

Reaction products of a phosphate ester-forming compound such as a phosphorous oxyhalide and a hindered thiobisphenol are obtained. Such products are useful as antioxidants in various compositions and materials.

6 Claims, No Drawings

PHOSPHATE ESTERS HINDERED THIOBISPHENOLS

BACKGROUND OF THE INVENTION

This invention relates to novel phosphate esters. More particularly it relates to reaction products of phosphate ester-forming phosphorous compounds and hindered thiobisphenols.

Synthetic polymers such as polyethylene, rubber, waxes, oils, fats, petroleum hydrocarbons and numerous other compounds are attacked by oxygen and eventually may become useless for their intended purpose. The chemical reaction by means of which oxygen attacks and degrades the compounds is a free radical chain reaction. Free radicals are produced by abstraction of hydrogen atoms from the molecules of the compounds by light, heat, mechanical action, active molecules and the like.

The free radicals are extremely reactive in the presence of air and oxygen, forming peroxide radicals, which in turn abstract hydrogen atoms from the molecules to form additional radicals. These again react with oxygen in the same manner. Thus, once started, the reaction is a self-perpetuating, degradative, continuous chain reaction until stopped. In order to prevent such degradation, various antioxidants have been added which react with and destroy the intermediate chemical-free radicals as they form, without producing equally reactive intermediates.

Various phosphorous-containing compounds and various phenols such 2, 2¹-methylenebis-(6-tertiarybutyl-4-methylphenol) have been used as antioxidants; however, the prior antioxidants have the disadvantage of losing effectiveness at comparatively high temperatures, even when used in synergistic combinations. Continuing work is therefore being done to obtain compounds with improved antioxidative properties.

We have found that the novel compounds of our invention surprisingly and unexpectedly exhibit increased stabilizing properties, and thereby; the quantity necessary to achieve a desired level of stabilization at such temperatures as are normally used for molding, calendaring, extrusion and other forming processes is reduced. Moreover, with the novel compounds of our invention, substantial degrees of stabilization can be attained at those higher temperatures at which combinations of phosphorous compounds separate and bisphenolic compounds are ineffective.

BRIEF DESCRIPTION OF THE INVENTION

The novel compounds of an invention are phosphate esters in which at least one of the available bonds on the phosphorus atom is connected to a hindered phenol through the oxygen remaining after removal of the hydrogen of a phenolic hydroxyl group. The hindered phenol is a thiobisphenol with the two phenolic rings bridged through a sulfur linkage; and with at least one hydroxyl group on each ring having a position ortho thereto substituted with a bulky hydrocarbon group of at least one carbon atom; and with the position para to said hydroxyl group on each ring substituted with the sulfur in the bridge, or with a bulky hydrocarbon group of at least one carbon atom, or with a halide group, or with —NO₂, or with —SR″, or with —OR″, or with —COOR″, or with —NR″R″, or with —NHR‴NH₂, or with —NHOH, or with —NHR‴OH; and having a halide group, or a —NO₂ group, or a —SR″ group, or a —OR″ group, or a —COOR″ group, or a —NR″R″ group, or a —NHR‴NH₂ group, or a —NHOH group, or a —NHR‴OH group, or a second bulky hydrocarbon group on each ring when said para position is substituted with the sulfur in the bridge. R″ and R‴ will be defined herein below. All available bonds on the phosphorous atom, from which the bonds to the "double bonded" phosphate oxygen atom are excluded, are connected to a phenolic compound through the oxygen remaining after removal of the hydrogen of the phenolic hydroxyl group. The phosphate esters of the invention also contain at least one phenolic hydroxyl group.

The novel compounds of our invention may constitute, for instance, the reaction products from about one reacted mole of a phosphate ester-forming phosphorous compound and at least one reacted mole and preferably three reacted moles of a hindered phenol as defined above, and if necessary at least one other phenolic compound in an amount so that each of the available bonds on the phosphorous atom is connected to a phenol through the oxygen remaining after the removal of the hydrogen of a phenolic hydroxyl group.

The reaction products are formed by employing conventional phosphate ester-forming conditions such as time, temperature and catalyst.

The production of the novel compounds of the invention was unexpected since attempts to prepare phosphite esters of the same hindered thiobisphenols by using phosphorous trichloride and the process of the application were not successful. It was therefore unpredictable that the particular phosphorous compounds would react to form the novel and useful products of the invention.

The compounds or reaction products of the invention surprisingly exhibit greatly improved antioxidative properties when compared to phosphorous compounds in which the hindered phenol (s), to which the available bond (s) on the phosphorous is connected through the oxygen remaining after removal of the hydrogen of a phenolic hydroxyl group, does not contain any substitution in the para position, or does not contain one of the above-disclosed groups when the para position is substituted with the sulfur in the bridge. It was unexpected that such substitution in the para position, or that the presence of one of the above-disclosed groups on each ring when the para position is substituted with the sulfur in the bridge would effectively increase the efficacy of the compounds as antioxidants.

The compounds of the invention also unexpectedly provide increased stabilization as compared to phosphate esters which did not contain any phenolic hydroxyl groups.

Thiobisphenol compounds are represented by the following formula:

I.

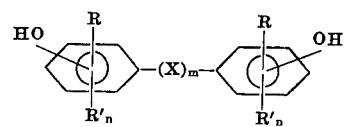

The X is a sulfur linkage, and can for example be,

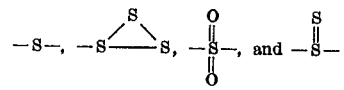

and preferably is S.

The *m* is a whole number integer of at least one, and preferably is 1–3, and most preferably is 1.

The OH group on each ring can be in any position but is preferably para to the sulfur linkage.

Each R individually is a bulky hydrocarbon group of at least one carbon atom and is ortho to the OH group on each ring. Usually the bulky hydrocarbon group is free of non-benezenoid unsaturation. R is preferably a bulky hydrocarbon group of from 1–22 carbon atoms such as methyl, ethyl, t-butyl, t-amyl, t-hexyl, cyclohexyl, t-pentyl, t-octyl, phenyl, naphthyl, α methylcyclohexyl, nonyl, benzyl, menthyl, isobornyl, phenanthryl, xylyl, anthranyl, norbornyl, cyclopropyl, cyclopentyl, bicyclohexyl, cyclobutyl and 1,2-dimethylcyclopropyl. More preferably R is a bulky hydrocarbon of from 3–12 carbon atoms, and even more preferably is an alkyl group containing 1–22 carbon atoms, and especially preferably is an alkyl group containing 3–12 carbon atoms of which t-butyl is the most preferred.

Each R′ individually is: a hydrocarbon group such as the hydrocarbon groups set forth above for R; or a halide group such as chlorine or bromine; or —NO₂; or —SR″, or —OR″; or —COOR″; or —NR″R″; or —NHR‴NH₂; or —NHOH;

or —NHR'''OH; wherein R'' is H or a hydrocarbon group as defined above for R, and R''' is an alkylene group of 1-22 carbon atoms and preferably of 1-12 carbon atoms. Some specific —SR''' groups are —SH; —SCH$_3$; —SC$_2$H$_5$; —SC$_9$H$_{19}$; —SC$_6$H$_5$; and —SC$_6$H$_{11}$. Some specific —OR'' groups are —OH; —OC$_6$H$_5$; —OC$_6$H$_{11}$; —OCH$_3$; —OC$_2$H$_5$; and —OC$_9$H$_{19}$.

Some specific —COOR'' groups are —COOH; —COOC$_2$H$_5$; —COOC$_9$H$_{19}$; —COOC$_6$H$_5$; —COOC$_6$H$_{11}$; and —COOCH$_3$.

Some specific —NR''R'' groups are —NH$_2$; —NHCH$_3$; —N(CH$_3$)$_2$;

$$-N\begin{matrix}C_6H_5\\C_6H_5\end{matrix}\ ;\ -N\begin{matrix}CH_3\\C_6H_5\end{matrix}\ ;\ -N\begin{matrix}H\\C_6H_5\end{matrix}\ ;\ -NHC_9H_{19};\ -N(C_9H_{19})_2;$$

and
$$-N\begin{matrix}H\\C_6H_{11}\end{matrix}\qquad -N(C_6H_{11})_2$$

Some specific —NHR'''NH$_2$ groups are —NHCH$_2$NH$_2$; —NHC$_2$H$_4$NH$_2$; —NHC$_9$H$_{18}$NH$_2$; and —NHC$_6$H$_{12}$NH$_2$.

Some specific —NHR'''OH groups are —NHCH$_2$OH; —NHC$_2$H$_4$OH; —NHC$_9$N$_{18}$OH; and —NHC$_6$H$_{12}$OH.

R' preferably is an alkyl group containing at least one carbon atom with methyl being the most preferred. Usually alkyl groups of not more than 22 carbon atoms are employed. Advantageously, the alkyl group contains 1-12 carbon atoms.

Preferably R' is present in a position meta to the hydroxyl group on each ring.

$n$ is a whole number integer from 1 to 3 and is preferably 1.

The position para to the hydroxyl group on each ring is substituted with the sulfur in the bridge or with R'. Preferably said para position is substituted with the sulfur in the bridge.

Specific examples of suitable thiobisphenols are:
4,4'-thiobis-(3,6-ditertiarybutylphenol);
4,4'-dithiobis-(3,6-ditertiarybutyphenol);
4,4'-thiobis-(6-nonyl-3-methylphenol);
4,4'-thiobis-(5-tertiarybutyl-2-methylphenol);
4,4'-thiobis-(6-tertiarybutyl-3-methylphenol);
bis-(5-tertiarybutyl-4-hydroxy-2-methyl) sulfone;
bis-(5-tertiarybutyl-4-hydroxy-2-methyl) sulfoxide;
4,4'-dithiobis-(3-methyl-6-nonylphenol);
4,4'-trithiobis-(3,63,6-ditertiarybutylphenol);
4,4'-thiobis-(6-ethyl-3-methylphenol);
4,4'-thiobis-(6-isopropyl-3-methylphenol);
4,4'-thiobis-(6-benzyl-3-methylphenol);
4,4'-thiobis-(6-cyclohexyl-3-methylphenol);
4,4'-dithiobis-(6-tertiarybutyl-3-methylphanol);
4,4'-thiobis-(6-tertiarybutyl-3-chlorophenol) and
4,4'-thiobis-(6-tertiarybutyl-3-nitrophenol).

The preferred thiobisphenol is:
4,4'-thiobis-(6-tertiarybutyl-3-methylphenol).

The other phenolic compound can be phenol or a substituted phenol. Preferably, the phenol is substituted in the positions ortho and/or para to the hydroxyl group on each phenolic ring with the appropriate ortho and/or para substituents as defined above for the hindered thiobisphenol, or with a hydroxyl group in any position. More preferably the phenol is either a hydroxy - or alkyl - substituted phenolic compound.

Suitable examples of the hydroxy-substituted phenolic compound are catechol, resorcinol and hydroquinone.

Suitable examples of alkyl-substituted phenolic compounds are thymol; carvacrol; 2-tertiarybutyl-4-methylphanol; 2-tertiarybutyl-4-chlorophenol; 2,6-dimethylphenol; 2,6-ditertiarybutyl-4-methylphenol; and 2-methyl-4-n-butylphenol. Of particular interest is 2-tertiarybutyl-4-methylphenol.

The catalyst used in preparing the phosphorous compounds of the invention can be any of the conventional catalysts used in preparing phosphate esters. Examples of suitable catalysts are metals such as copper powder, iron filings, calcium, aluminum and magnesium; halides such as aluminum chloride, magnesium chloride, ferric chloride, tin tetrachloride, zinc chloride, boron trifluoride, titanium trichloride, and titanium tetrachloride; sulfates such as copper sulfate; and oxides such as magnesium oxide and copper oxide. The preferred catalyst is magnesium. The amount of catalyst is usually present in amounts between 0.5 percent and 5 percent by weight based on the weight of the phenolic compounds.

The diluent can be any liquid provided it is inert (not reactive in any manner which will harm the reaction or the product) and should dissolve at least one of the reactants. Examples of suitable solvents are the chlorinated hydrocarbons and high boiling hydrocarbons. The preferred solvent is o-dichlorobenzene. The quantity of diluent is most commonly present in amounts between 50 percent and 300 percent by weight based on the weight of the phenolic compounds.

The process is not limited to specific reaction temperatures, since the reaction can be carried out over a wide range of temperatures. For example, the process can be carried out at temperatures of from about 0° C to temperatures of about 200° C. The preferred temperature range varies from about 80° C to 195° C, and the most preferred temperature range is from about 165° C to 175° C. Also the process is not limited to any specific times, since the time required will vary primarily dependent upon the particular reactants, temperatures, and catalysts. Preferably the reaction times vary from about 1 hour to about 72 hours. About 24 hours is the reaction time which is most commonly used.

Atmospheric pressure is the most commonly used pressure for carrying out our invention. Of course, higher or lower pressures can be employed when desired.

Some of the novel phosphate esters of our invention are illustrated by the following structures:

II.

$$\overset{O}{\underset{\|}{P}}\left[-O-\underset{R'_n}{\overset{R}{\underset{\diagdown}{\bigcirc}}}-(X)_m-\underset{R'_n}{\overset{R}{\underset{\diagdown}{\bigcirc}}}-OH\right]_3$$

III.

[structure with phosphate ester]

IV.

[structure with phosphate ester]

wherein R,R', m and n have the same definitions and positions set forth in respect to Formula I.

The phosphorous compounds of the invention are useful as antioxidants in a wide variety of materials. Among such materials are synthetic polymers, rubber, waxes, fats, oils and petroleum products. Among the synthetic polymers which can be stabilized with the products of this invention are: polyolefins such as polyethylene, polypropylene and polybutene; diene rubbers such as polyisoprene, polybutadiene, copolymers of conjugated dienes and at least one other copolymerizable monomer such as styrene, acrylonitrile, methyl acrylate, and 2-vinyl pyridine; polyesters; polyacetals, epoxies, polystyrene; polyacrylates; vinyl chloride polymers; polyurethanes and others. The products of this invention are particularly effective in stabilizing polyolefins, e.g. polypropylene and polyethylene. The amount of antioxidant needed to stabilize a particular amount of polymeric material can obviously be varied over a wide range of proportions dependent upon the identity of the specific polymeric material, the desired degree of stabilization, and the environment in which the material is to be used. An amount of about 0.1 percent by weight based upon the material to be stabilized is very effective. The threshold at which the compounds of our invention are effective is about 0.001 percent by weight based upon the weight of the material to be stabilized. The compounds of the invention are used in amounts as high as 5 percent by weight or higher based upon the weight of the material to be stabilized.

The compounds of this invention have exhibited performance superior to the prior art antioxidants to which they have been compared as will be illustrated in the following non-limiting examples in which all parts are by weight unless the contrary is stated.

EXAMPLE 1

To a mixture of 3 moles of 4,4'-thiobis-(6-tertiarybutyl-3-methylphenol) 4,000 parts of o-dichlorobenzene as an inert solvent, and 0.4 moles of a magnesium metal catalyst in a glass-lined container of flask equipped with a glass-surfaced stirrer or agitator is added all at once and with agitation, 1 mole of phosphorous oxychloride. The resultant mixture is agitated for 24 hours at a pressure of about one atmosphere with the temperature being maintained between 165° C and 175° C. Hydrogen chloride gas evolves as the reaction proceeds and is neutralized in a scrubbing device. The reaction mixture is cooled, 1000 parts of water are added and the magnesium catalyst is separated by filtration. The clarified mixture is then neutralized to a pH between 6 and 8 by use of an aqueous sodium carbonate solution. The organic portion of the mixture is then washed with 1,000 parts of water, and an organic layer is then separated from the aqueous portion of the mixture. The reaction product and inert solvent are then separated by vacuum distillation. The reaction product, tris[2-tertiarybutyl -4-(2-methyl-4-hydroxy -5-tertiary-butylphenylthio)-5-methylphenyl] phosphate, is a clear friable glass melting between 62° C and 67° C, and has the following structure as determined by elemental analysis and IR spectra:

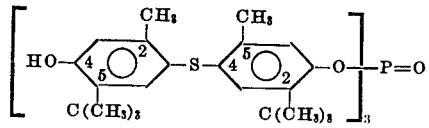

EXAMPLE A

The product of Example 1 is admixed with a polyethylene of 0.960 density and approximately 300,000 molecular weight in a steel container and the mixture is extruded twice at 300° F. The concentration of the product of Example 1 is then adjusted to 0.1 percent by weight of the polymer by the addition of more of the polyethylene and the mixture is again extruded twice at 300° F. The resulting polyethylene composition is then pressed into a 6 – 6.5 mil film at 310° F. and 1,280 p.s.i. on a 10-inch hydraulic ram press. Likewise a film of the same polyethylene without any antioxidant and a film of the same polyethylene containing 0.1 percent of some other antioxidants are prepared by the method set forth above. The resulting films are then subjected to 125° ± 1°C in a forced draft oven. The absorbance in the carbonyl region of the IR Spectrum (5.8 angstroms) is then recorded after periods of exposure. When the observed absorbance reaches 94 percent, the sample is considered to be "oxidized" and the time of exposure to reach this point is recorded in the table below:

TABLE I

| Additive | Amount | Time in hrs, to reach 94% absorbance |
|---|---|---|
| None | | 50 |
| 4,4'-thiobis-(6-tertiary-butyl-3-methylphenol) | .10 | 235 |
| Reaction product of Example 1 | .10 | 930 |
| ![structure 1] | .10 | 74 |
| ![structure 2] | .10 | 60 |
| ![structure 3] | .10 | 60 |
| ![structure 4] | .10 | 90 |

EXAMPLE B

The product of Example 1 is admixed with a polypropylene of 0.90 density and approximately 325,000 molecular weight in a steel container and the mixture is extruded twice at 380° F. The resulting polypropylene compositions containing 0.5 percent by weight, of the product of Example 1 are then pressed into a 6 – 6.5 mil film at 350° F. and 1,280 p.s.i. on a 10-inch hydraulic ram press. Likewise a film of the same polypropylene without any antioxidant and a film of the same polypropylene containing 0.5 percent of 2,2'-methylenebis-(6-tertiarybutyl-4-methylphenol) are prepared by the method set forth above. The resulting three films are then subjected to 150°±1° C in a forced draft oven. The asorbance in the carbonyl region of the IR Spectrum (5.8 angstroms) is then recorded after periods of exposure. When absorbance reaches 94 percent the sample is considered to be "oxidized," and the time of exposure to reach this point is recorded in the table below:

TABLE II

| Additive | Amount | Time in hrs. to reach 94% Absorbances |
|---|---|---|
| NONE | | 4 |
| 2,2'-thiobis-(6-tertiary-butyl-4-methyl phenol) | 0.5 | 6 |
| Reaction Product of Example 1 | 0.5 | 166 |

From the above tables, it is readily apparent that the phosphate esters of our invention exhibit greatly improved stabilizing properties as compared to stabilizers outside the scope of the invention.

What is claimed is:

1. A phosphate ester of the formula:

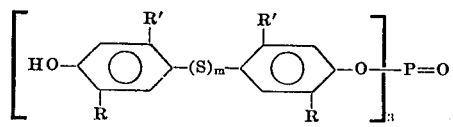

wherein R and R' each represents the same or different alkyl, cycloalkyl or aryl group containing not in excess of 22 carbon atoms and m is an integer of from 1–3 inclusive.

2. A phosphate ester in accordance with claim 1 wherein R and R' each represents the same or different alkyl group.

3. A phosphate ester in accordance with claim 2 wherein R and R' represents the same or different alkyl group containing not in excess of 12 carbon atoms and wherein $m$ is 1.

4. A phosphate ester in accordance with claim 3 wherein R represents an alkyl group containing from 3–12 carbon atoms.

5. A phosphate ester in accordance with claim 4 wherein R represents a tertiary butyl group.

6. Tris [2-tertiarybutyl-4-(2-methyl-4-hydroxy-5-tertiarybutylphenylthio)-5-methylphenyl] phosphate.

* * * * *

UNITED STATES PATENT OFFICE
CERTIFICATE OF CORRECTION

Patent No. 3,676,530                    Dated July 11, 1972

Inventor(s) Michael Robin and Sheldon R. Schulte

It is certified that error appears in the above-identified patent and that said Letters Patent are hereby corrected as shown below:

Column 2, line 19,
    after "compounds" insert --used in the invention and the hindered thiobisphenols--.

In Column 2, line 50; "-S-, -S$\overset{S}{\triangle}$S, -$\overset{O}{\underset{O}{S}}$-, and $\overset{S}{\underset{}{S}}$" should be corrected to -- -S-, -S$\overset{S}{\triangle}$S-, -$\overset{O}{\underset{O}{S}}$-, -$\overset{O}{\underset{O}{S}}$-, and -$\overset{S}{\underset{}{S}}$- --.

In Column 3, line 48; ". . .(3,63,3-. . .)" should be corrected to --. . .-(3,6-. . .)--.

In Column 3, line 53; "(. . .3-methylphanol)" should be corrected to --(. . .3-methylphenol)--

In Column 3, line 69; "(. . .4-methylphanol) should be corrected to --(. . .4-methylphenol)--.

Signed and sealed this 1st day of October 1974.

(SEAL)
Attest:

McCOY M. GIBSON JR.                    C. MARSHALL DANN
Attesting Officer                      Commissioner of Patents